US005714679A

United States Patent [19]

Nichols et al.

[11] Patent Number: 5,714,679

[45] Date of Patent: Feb. 3, 1998

[54] PORTABLE APPARATUS FOR TESTING AN INTERNAL COMBUSTION ENGINE

[76] Inventors: Steven J. Nichols, 4750 Briarhill Rd., Kalamazoo, Mich. 49024; Randee L. Kyrola, 4725 Lake Sarah Heights Cir., Rockford, Minn. 55373; Eric J. VandeZande, 540 Academy St., Owatonna, Minn. 55060; Karl E. Brown, 322 6th Ave. West, Shakopee, Minn. 55379

[21] Appl. No.: 720,860

[22] Filed: Oct. 2, 1996

[51] Int. Cl.$^6$ .......... G01M 15/00

[52] U.S. Cl. .......... 73/35.08; 73/117.3; 340/439; 324/399; 324/402

[58] Field of Search .......... 73/35.08, 116, 73/117.2, 117.3; 364/431.03; 340/439; 324/399, 402

[56] References Cited

U.S. PATENT DOCUMENTS

| | | | |
|---|---|---|---|
| Re. 29,810 | 10/1978 | Marino | 73/117.3 |
| 4,006,403 | 2/1977 | Olsen et al. | 324/15 |
| 4,291,383 | 9/1981 | Tedeschi et al. | 364/551 |
| 4,394,742 | 7/1983 | Crummer et al. | 364/487 |
| 4,935,950 | 6/1990 | Ranallo et al. | 378/207 |
| 5,068,613 | 11/1991 | Kreft et al. | 324/379 |
| 5,191,788 | 3/1993 | Nishimura | 73/117.3 |
| 5,201,293 | 4/1993 | Langner et al. | 123/436 |
| 5,269,282 | 12/1993 | Miyata et al. | 73/116 |
| 5,334,938 | 8/1994 | Kugler et al. | 324/399 |
| 5,343,844 | 9/1994 | Fukui et al. | 73/116 |
| 5,347,856 | 9/1994 | Miyata et al. | 73/116 |
| 5,349,299 | 9/1994 | Kanehiro et al. | 324/399 |
| 5,365,910 | 11/1994 | Miyata et al. | 324/399 |
| 5,399,972 | 3/1995 | Hnat et al. | 324/399 |
| 5,495,757 | 3/1996 | Atanasyan et al. | 73/35.06 |

OTHER PUBLICATIONS

Advertisement of "Digital Ignition System Analyzer", *JC Whitney* catalog, Nov. 1995.

Advertisement and coupon for "MT2700 DIS/kv Probe", *Snap–on*® catalog, Jan. 1995.

Product Outline of "Ignition System Tester ZT 81", Nov. 1994.

*Primary Examiner*—George M. Dombroske

[57] ABSTRACT

An apparatus for testing an internal combustion engine is disclosed. The apparatus comprises a probe for electrical connection to at least one spark plug wire of the engine being tested. A peak hold circuit operates to store a representation of a peak firing voltage of the rectified secondary ignition signal and attenuates the stored representation at a predetermined rate over time to enable measurement of peak firing voltage. The testing apparatus is connected to a voltmeter to display a value of the peak firing voltage. Alternatively, the testing apparatus includes a display for displaying the value of the peak firing voltage. Preferably, the testing apparatus is housed in a housing of a size to be held in a user's hand, with a power supply contained therein.

20 Claims, 10 Drawing Sheets

PORTABLE APPARATUS FOR TESTING AN INTERNAL COMBUSTION ENGINE

BACKGROUND OF THE INVENTION

The present invention relates generally to an apparatus for testing an internal combustion engine, and more particularly to a portable engine tester for measuring engine ignition parameters such as firing voltage, burn voltage and burn time.

The firing voltage of an internal combustion engine is an important quantity for testing operations and diagnosing problems of the engine. The firing voltage of an engine is the peak voltage attained inside the combustion chamber when the burn initially starts. The progression of voltage values inside the combustion chamber, which can be sensed for a particular cylinder by connecting to a spark plug wire of the engine, is hereinafter referred to as the secondary ignition signal of the engine. Burn voltage and burn time are also important quantities. Burn voltage is the voltage the secondary ignition signal falls to after the firing voltage has been attained, but before the secondary ignition signal drops to approximately 12–15 volts. Burn time is the amount of time that the secondary ignition signal holds at the burn voltage value, after the firing voltage has been attained and before the secondary ignition signal drops below the voltage required to sustain combustion chamber burning. Thus, it is important for vehicle diagnosis and repair to be able to easily and accurately measure firing voltage, and also burn voltage and burn time.

Measuring of these values has typically been accomplished by using a large, expensive engine analyzer. These engine analyzers contain many functions, and are typically operated by wall socket power. A large engine analyzer is often also connected to a PC to provide full functionality and testing capability. These analyzers are bulky, expensive, and often require considerable training to operate. Multiple complex connections to different parts of the engine being tested usually must be made. Since large engine analyzers are nearly always designed for diagnosis of an automobile, these analyzers are incapable of measuring engine parameters for other types of vehicles or engines. Due to the size of these analyzers, they are not feasible for use when a car is being driven over highways or streets, when an engine is in a remote location, or when a boat is in the water, for example.

Inexpensive portable units have been designed to indicate the presence of a spark voltage. However, these units simply do not measure enough information for meaningful diagnosis to take place; the actual values of firing voltage, burn voltage and burn time are not available from such devices.

An ordinary voltmeter generally cannot be used to measure the firing voltage of an ignition system. The firing voltage signal is a very narrow spike, with a short time duration, making detection and measurement of the firing voltage signal by a voltmeter very difficult. The firing voltage is typically on the order of 9–15 kilovolts (with a maximum of 50–60 kilovolts), which is off the scale of most voltmeters, and at the least cannot be precisely displayed on the voltmeter. Ordinary voltmeters are also sensitive to the polarity of the secondary ignition signal. This causes problems when a distributorless ignition system is being tested, which has complementary opposite polarity firing signals due to its shared coil configuration.

Thus, there is a need for a system to test the secondary ignition signal of an internal combustion engine that is small, inexpensive, and easy to use, while still being able to precisely and accurately measure firing voltage, and also burn voltage and burn time.

SUMMARY OF THE INVENTION

The present invention is directed to an apparatus for testing an internal combustion engine. The apparatus includes a probe to electrically connect the testing apparatus to at least one spark plug wire of the engine being tested. A rectifying circuit converts a secondary ignition signal received from the probe to an absolute value of the secondary ignition signal. A peak hold circuit stores a representation of a peak firing voltage signal of the rectified secondary ignition signal, and attenuates the stored representation at a predetermined rate over time so that the peak firing voltage signal can be measured by a voltmeter. The testing apparatus is connected to a voltmeter to display a value of the peak firing voltage signal. Preferably, the testing apparatus is housed in a housing of a size to be held in a user's hand, so as to be portable. A power supply is preferably contained in the housing.

A further aspect of the testing apparatus includes a probe for electrically connecting the testing apparatus to at least one spark plug wire of the engine. A dwell circuit converts a secondary ignition signal received from the probe to an absolute value of the secondary ignition signal, and attenuates the secondary ignition signal by a predetermined amount. A peak detect circuit detects a peak firing voltage signal of the attenuated secondary ignition signal. A peak hold circuit stores the peak firing voltage signal of the attenuated secondary ignition signal, and attenuates the stored peak firing voltage signal at a predetermined rate over time so that its value can be accurately measured. An amplifier increases the amplitude of the attenuated secondary ignition signal so that burn voltage of the secondary ignition signal can be accurately measured. A processor receives the outputs from the peak detect circuit, peak hold circuit, and amplifier, and converts the outputs into data values representing firing voltage, burn voltage and burn time of the engine. The testing apparatus is preferably housed in a housing of a size to be held in a user's hand, so as to be portable. A power supply is preferably contained in the housing.

Another aspect of the invention is directed to a portable apparatus for testing an internal combustion engine, comprising a housing of a size to be held in a user's hand. A power source is contained within the housing. A probe electrically connects the portable testing apparatus to at least one spark plug wire of the engine. Circuitry within the housing receives a secondary ignition signal from the probe and creates a representation of the secondary ignition signal to enable measurement of peak firing voltage of the secondary ignition signal. A display is provided to display the value of the peak firing voltage of the secondary ignition signal. Further aspects of the invention include circuitry within the housing creating a plurality of representations of the secondary ignition signal to enable measurement of peak firing voltage, burn voltage and burn time. The display operates to selectively display values of the peak firing voltage, burn voltage and burn time.

In another aspect of the invention, the testing apparatus includes probes for electrically connecting the testing apparatus to a plurality of spark plug wires of the engine. Circuitry is provided to selectively receive a secondary ignition signal from one of the plurality of spark plug wires of the engine.

DETAILED DESCRIPTION OF THE PREFERRED EMBODIMENTS

Figure 1:
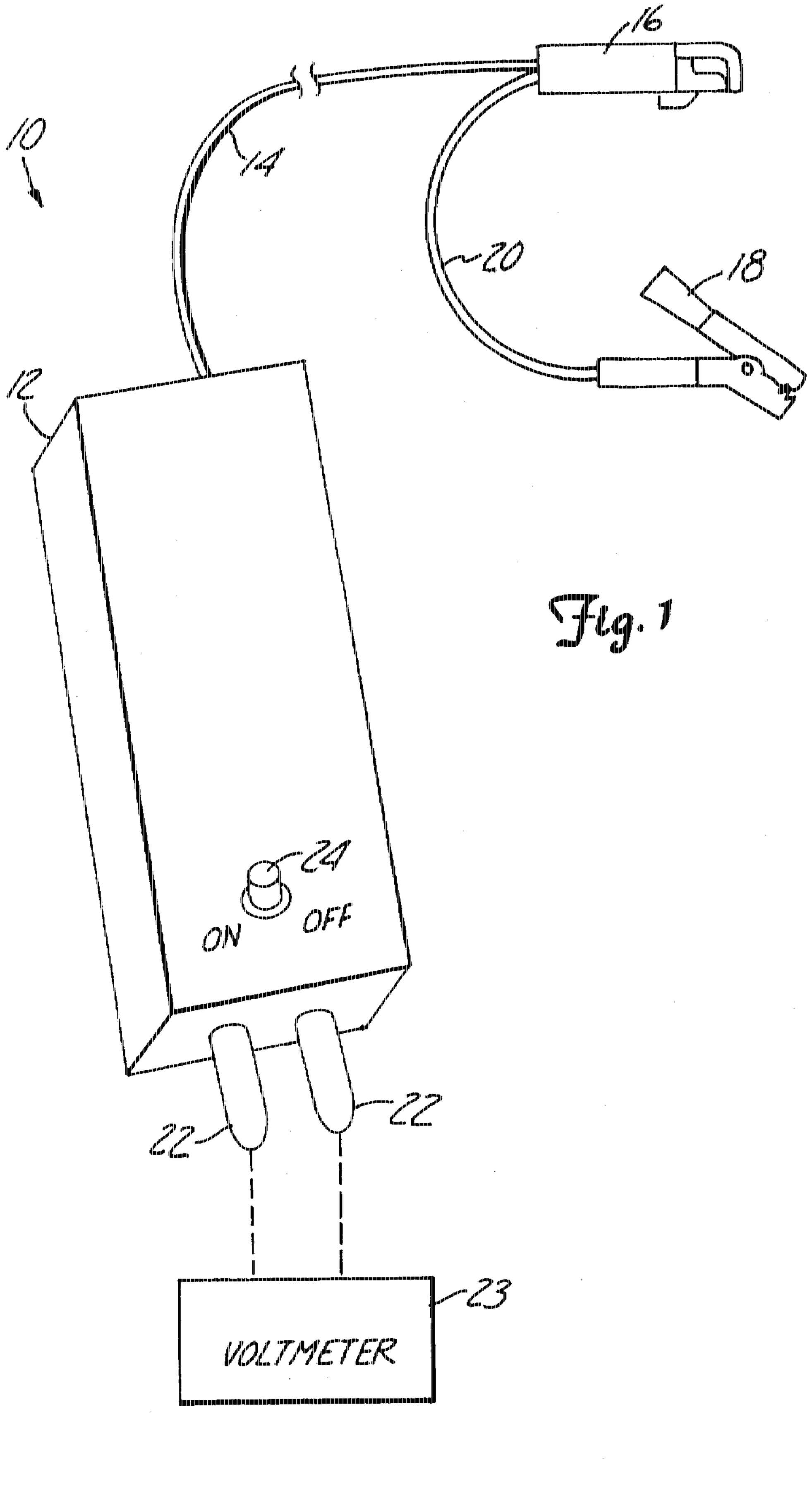
FIG. 1 is a diagrammatic illustration of an embodiment of the secondary ignition signal tester of the present invention.

FIG. 1 shows a secondary ignition signal tester 10 according to the present invention. The tester 10 includes a housing 12 containing the internal circuitry of the tester 10. Housing 12 is preferably of a size to be held in the hand of a user, and contains an internal power supply such as a 9 V battery (not shown). Cable 14 extends from housing 12 to connect ground clamp 18 and probe 16 to housing 12 of tester 10. Cable 20 allows ground clamp 18 to extend a distance from probe 16, while maintaining electrical connection through cable 14 to housing 12. Ground clamp 18 is connected to the block of the engine to be tested, while probe 16 is connected to a spark plug wire of the engine. Probe 16 is preferably a capacitive pickup probe that non-intrusively attaches around the spark plug wire, so that the secondary ignition signal is not itself affected by the connection of probe 16. Alternatively, other types of probes might be used. Tester 10 includes a rectifying circuit so that tester 10 is not sensitive to the polarity of signal on probe 16 from the spark plug wire of the engine. This is important since distributorless ignition systems (DIS) have spark plugs that share coils and thus employ complementary opposite polarity secondary ignition signals. Plugs 22 are provided on housing 12 to connect tester 10 to a voltmeter 23. Plugs 22 may be provided at any position on the housing that allows connection to the external voltmeter 23, or alternatively cabling or other connection means may be provided to allow connection to the voltmeter 23. A preferred voltmeter 23 is an integrating volt/ohm meter including a digital display. Switch 24 is provided on housing 12 to allow a user to turn tester 10 on and off.

In operation, a user connects ground clamp 18 to a block of the engine to be tested, and connects probe 16 to a spark plug wire of the engine to be tested. The engine is started, so that a secondary ignition signal is present on the spark plug wire and the signal is transmitted from probe 16 (along with a ground signal from ground clamp 18) through cable 14 to the circuitry within housing 12. The housing 12 of tester 10 is connected to a voltmeter by plugs 22. While operating the tester 10, a user switches switch 24 to the "on" position, so that power is supplied to the circuitry within housing 12 from a self-contained battery. The value of peak firing voltage from the secondary ignition signal on the spark plug wire to which probe 16 is connected is displayed on the millivolt scale of the voltmeter 23 connected to the housing 12. Thus, tester 10 can precisely measure the value of peak firing voltage of an engine's combustion, and displays that value on the millivolt scale on the display of voltmeter 23.

Figure 2:
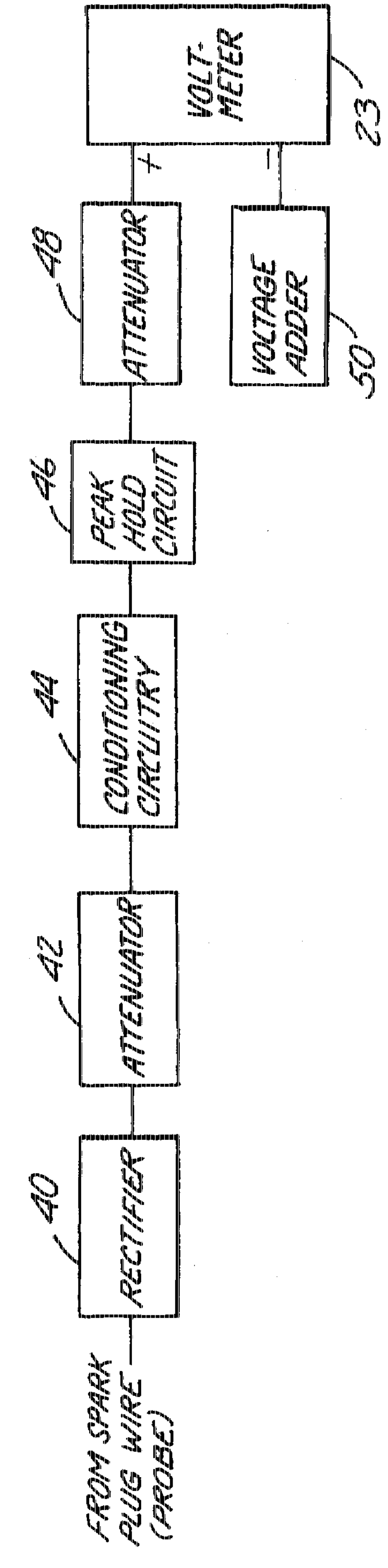
FIG. 2 is a block diagram of the functional elements of the secondary ignition signal tester shown in FIG. 1.

FIG. 2 shows in block form the internal circuitry of tester 10 shown in FIG. 1. A secondary ignition signal is received from a spark plug wire and is input into rectifier 40. Rectifier 40 outputs the absolute value of the secondary ignition signal, which is then input to attenuator 42. Attenuator 42 reduces the signal into an appropriate input range for the circuitry of the tester 10, so that the capacitive nature of the tester probe 16 (FIG. 1) and the attenuator 42 together operate to convert the secondary ignition signal from an order of kilovolts to an order of volts. The attenuated signal is then sent through conditioning circuit 44, which blocks DC voltages in the signal; removes drift, and protects against excessively high voltage transients. Peak hold circuit 46 operates on the signal to hold the peak firing voltage of the secondary ignition signal and controllably reduce it so that its value can be measured by a calibrated integrating voltmeter 23. The fall rate of the signal from the firing voltage amplitude is controlled within peak hold circuit 46. Attenuator 48 further attenuates the signal from the peak hold circuit 46, converting it from volts to millivolts. This attenuation is desirable because the millivolt range is the range where an external voltmeter 23 has its greatest readability, displaying the greatest number of significant digits. Voltage adder 50 serves to add a known voltage to a ground reference signal of the voltmeter 23, to stabilize the ground reference signal at a known value. The attenuating circuitry 42 and 48, fall time from peak hold circuit 46, and voltage adder 50 are calibrated so that after all the conditioning shown, the signal sent to the voltmeter 23 will, on the voltmeter's millivolt scale, equal in kilovolts the value of the peak firing voltage of the secondary ignition signal. This value can be displayed directly by the voltmeter 23 on its millivolt scale.

Figure 3:
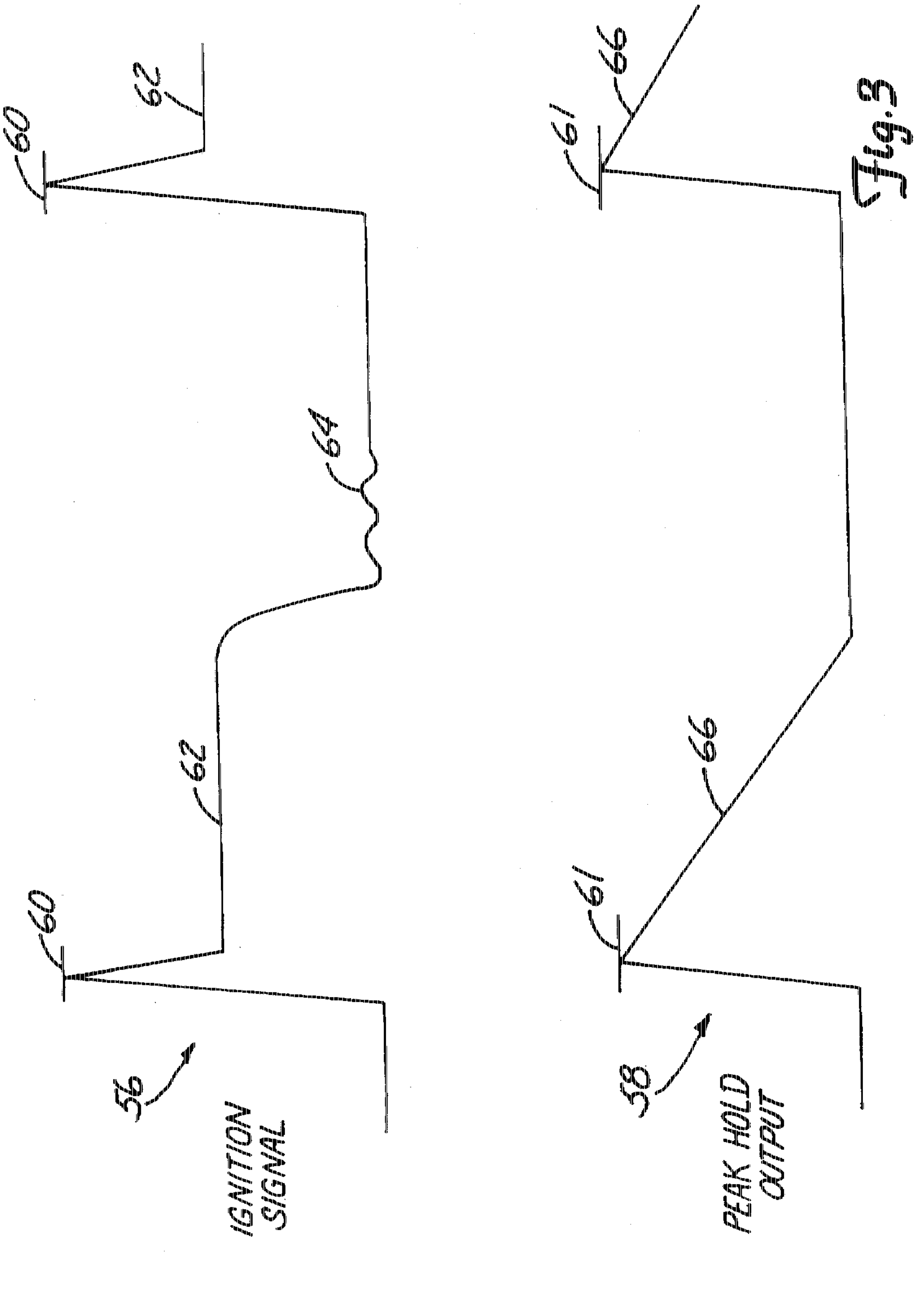
FIG. 3 is a timing diagram of signals at various points in the block diagram of FIG. 2.

FIG. 3 shows a timing diagram of the secondary ignition signal 56 and the output 58 of the peak hold circuit 46 (FIG. 2). Secondary ignition signal 56 spikes up to the peak firing voltage 60. The signal then falls off to burn voltage level 62. After a time at burn voltage level 62, secondary ignition signal 56 falls to approximately 12–15 volts, with ringing 64. Peak hold output signal 58 mirrors secondary ignition signal 56 and spikes to attenuated peak firing voltage 61. Peak hold output signal 58 then falls from the attenuated peak firing voltage 61 with slope 66, which is a fall rate controlled by peak hold circuit 46. Through proper calibration of the attenuating circuitry 42 and 48 and the fall time of peak hold circuit 46, the peak firing voltage 60 can be measured by an integrating digital voltmeter 23 from the peak hold output signal 58.

Figure 4:
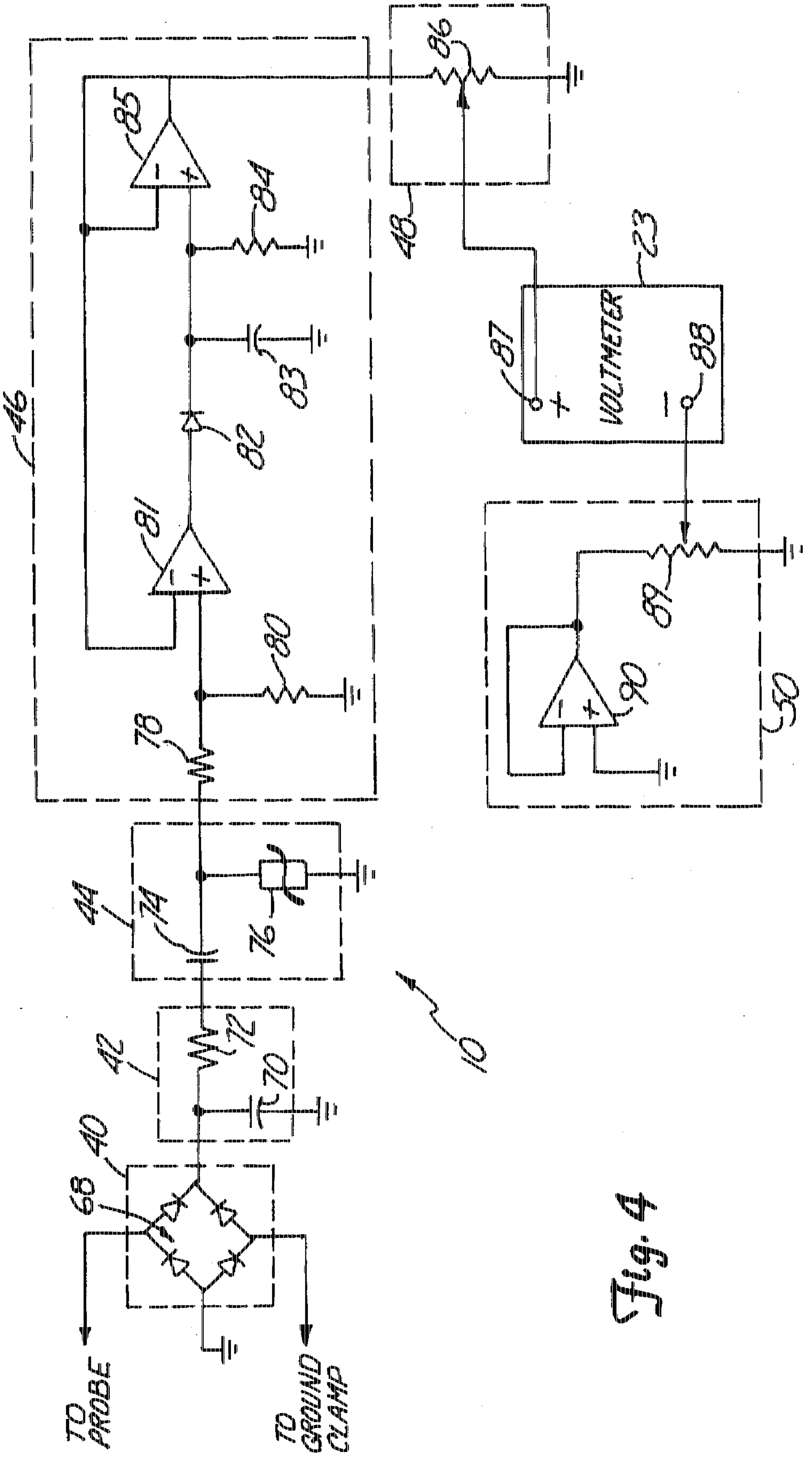
FIG. 4 is a schematic diagram of the circuit elements shown in FIG. 2.

FIG. 4 is a schematic diagram of the circuit elements of tester 10, shown in block diagram form in FIG. 3. A secondary ignition signal comes from the probe and ground clamp and enters rectifier 40, which comprises diode bridge 68. This circuit serves to convert the secondary ignition signal into the absolute value of the secondary ignition signal. The rectified secondary ignition signal then-enters attenuating circuit 42, which comprises capacitor 70 and resistor 72. A possible value for capacitor 70 is 0.001 microfarads, and a possible value for resistor 72 is 10 kiloohms. These values will result in attenuation to a reasonable level, operating with the capacitive nature of the tester probe to reduce the secondary ignition signal from the order of kilovolts to the order of volts. The attenuated secondary ignition signal then passes into conditioning circuit block 44, which comprises capacitor 74 and varistor 76. The conditioning circuitry 44 operates to block DC voltage in the secondary ignition signal, remove drift, and limit the voltage at the positive terminal of varistor 76 to protect components of peak hold circuit 46. The secondary ignition signal then passes to peak hold circuit 46, which comprises resistor 78, resistor 80, operational amplifier 81, diode 82, capacitor 83, resistor 84 and operational amplifier 85. Peak hold circuit 46 operates on the representation of the secondary ignition signal to produce an output signal that gradually slopes from the attenuated peak firing voltage of the secondary ignition signal to zero, at a controlled fall rate. The fall rate is controlled by the selection of values for capacitor 83 and resistor 84. For example, capacitor 83 may be selected to have a value of 0.1 microfarads, and resistor 84 may be selected to have a value of 1 megaohm. The fall time of the peak hold circuit is the value of capacitor 83 multiplied by the value of resistor 84. For the example given, the fall time would be 0.1 microfarads multiplied by 1 megaohm, equalling 0.1 seconds. The peak hold signal is then sent to attenuating circuit 48, which is a voltage divider utilizing potentiometer 86 to divide the voltage from the volts range into the millivolts range. The attenuated signal is then sent to the positive terminal of a voltmeter 23. Voltage adding circuitry 50, comprising potentiometer 89 and operational amplifier 90, serves to add a known voltage to the negative terminal 88 of the voltmeter 23. This ensures that the ground reference of the voltmeter 23 is a known value. By calibrating the peak hold circuit (adjusting fall time by selecting values for capacitor 83 and resistor 84), adjusting potentiometer 86 and adjusting potentiometer 89, an accurate and precise firing voltage measurement in the millivolt range of the voltmeter 23 can be obtained, corresponding to the kilovolt value of actual firing voltage from the secondary ignition signal.

Figure 5:
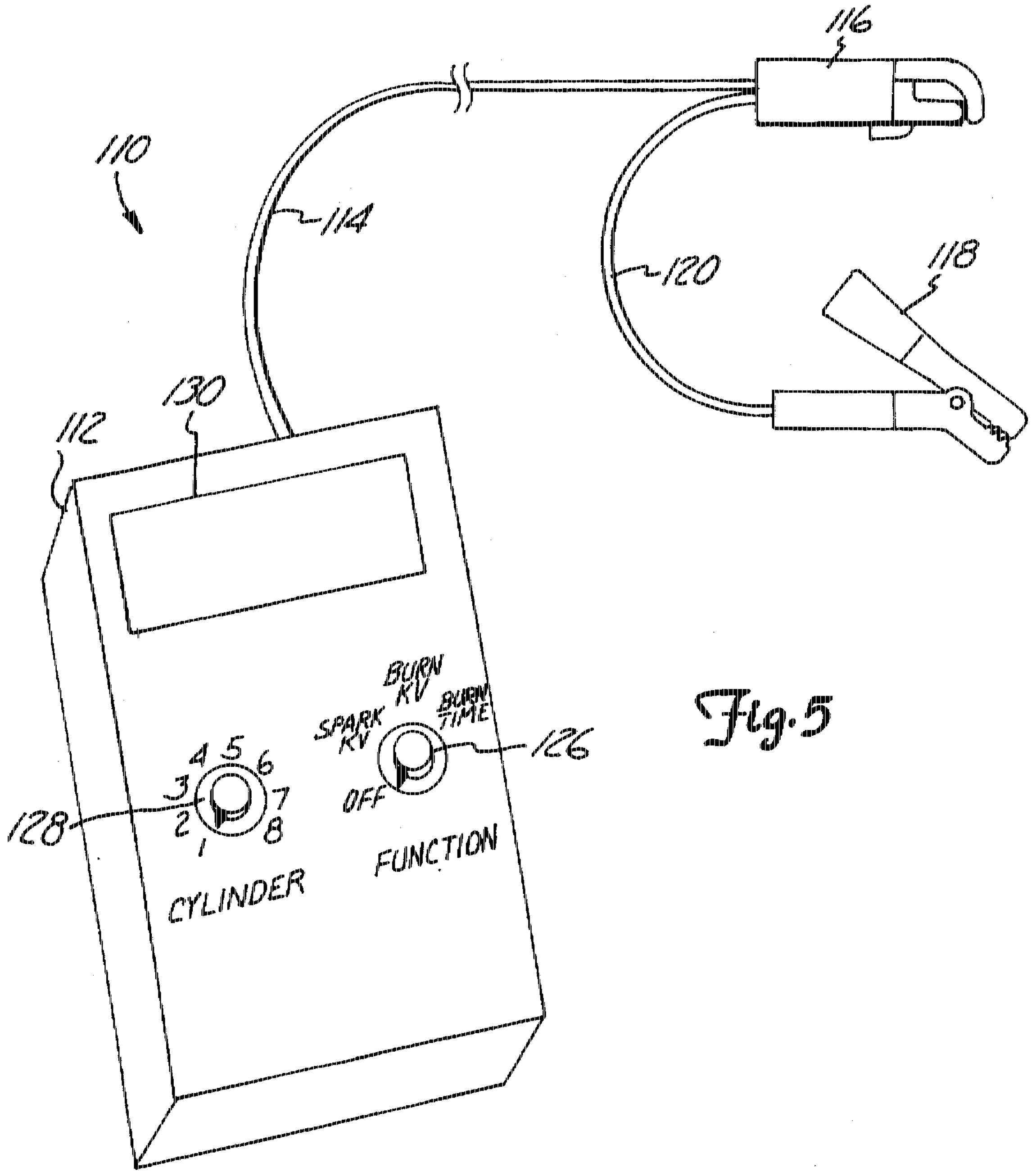
FIG. 5 is a diagrammatic illustration of another embodiment of the secondary ignition signal tester of the present invention.

FIG. 5 shows another embodiment of the apparatus of the present invention. Tester 110 includes housing 112 containing internal circuitry of tester 110. Housing 112 is preferably of a size to be held in the hand of a user, and contains an internal power supply such as a 9 V battery (not shown). Cable 114 extends from housing 112 to connect ground clamp 118 and probe 116 to housing 112 of tester 110. Cable 120 allows ground clamp 118 to extend a distance from probe 116, while maintaining electrical connection through cable 114 to housing 112. Ground clamp 118 is connected to the block of the engine to be tested, while probe 116 is connected to a spark plug wire of the engine. Probe 116 is preferably a capacitive pickup probe that non-intrusively attaches around the spark plug wire, so that the secondary ignition signal is not itself affected by the connection of probe 16. Alternatively, other types of probes might be used. Tester 110 includes a rectifying circuit so that tester 110 is not sensitive to the polarity of signal on probe 116 from the spark plug wire of the engine. This is important since distributorless ignition systems (DIS) have spark plugs that share a coils and thus employ complementary opposite polarity secondary ignition signals. Display 130 is provided on housing 112 to allow a user to view measurements of engine ignition parameters taken by tester 110. Switch 126 is provided on housing 112 tip allow a user to select which parameter measurement to display. In an alternative embodiment, switch 128 is provided on housing 112 to allow a user to choose which cylinder of the engine being tested to display. In this embodiment; several probes 118 are provided and connected to different spark plug wires on the engine being tested.

In operation, a user connects ground clamp 118 to a block of an engine to be tested, and connects probe 116 to a spark plug wire of the engine to be tested. The engine is started, so that a secondary ignition signal is present on the spark plug wire, and the signal is transmitted from probe 116 (along with a ground signal from ground clamp 118) through cable 114 to the circuitry within housing 112. The circuitry within housing 112 operates to measure firing voltage, burn voltage and burn time of the secondary ignition signal received on cable 114. A user selects which parameter to display on display 130 by mining switch 126 to "spark kV", "burn kV" or "burn time". Display 130 shows the current value, and also may display the maximum and minimum stored values, of the parameter selected. In the alternative embodiment where several cylinders of an engine may be tested, several probes 118 are provided to connect to different spark plug wires of different cylinders of the engine. To select which of the cylinders to test, a user positions switch 128 to the appropriate cylinder number, and measurements of parameters for the selected cylinder are displayed on display 130.

Figure 6:
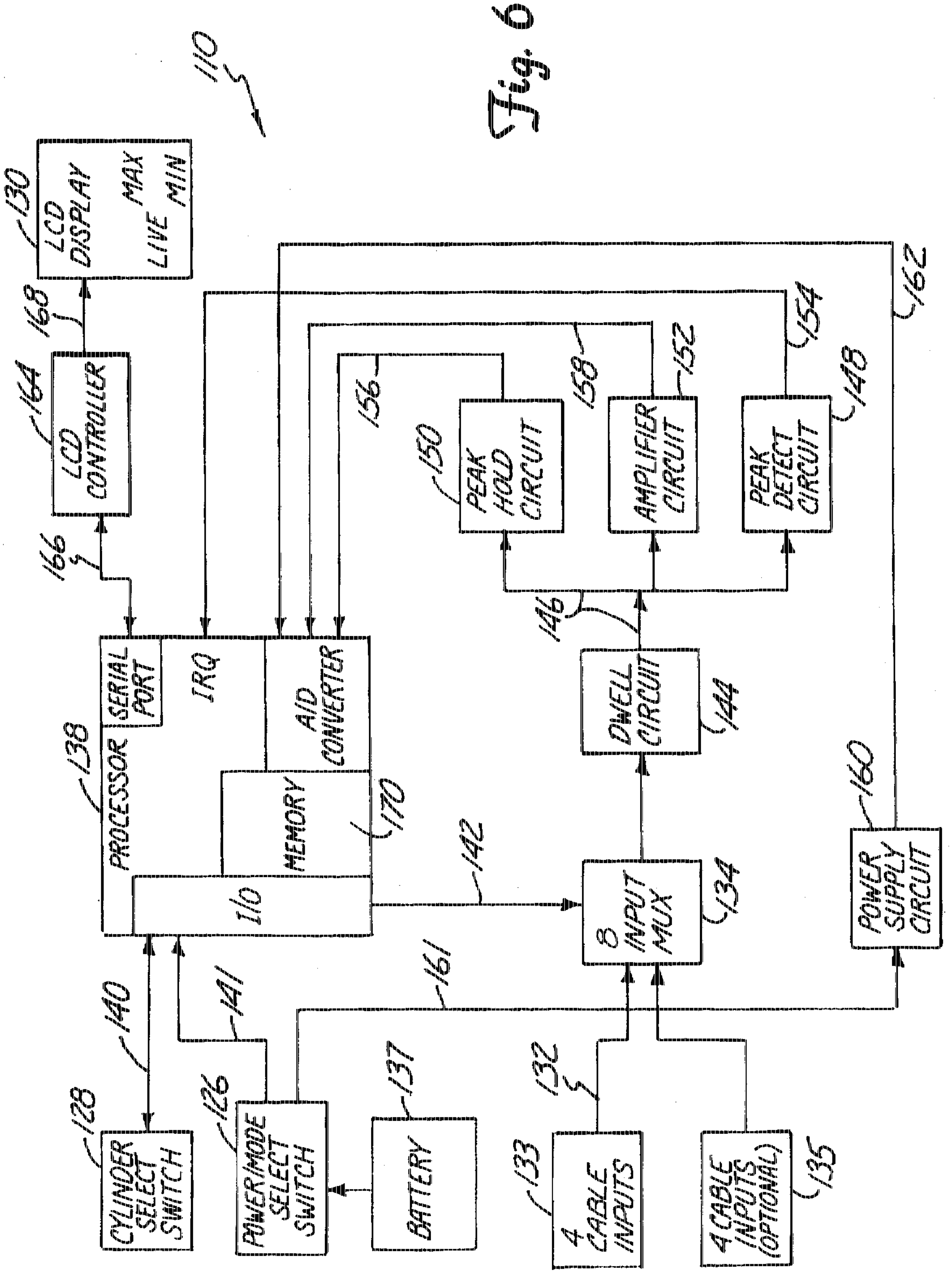
FIG. 6 is a block diagram showing the functional elements of the secondary ignition signal tester shown in FIG. 5.

FIG. 6 shows in block diagram form the internal circuitry of tester 110 according to the embodiment shown in FIG. 5. Secondary ignition signals from cable inputs 133 and 135 enter the circuitry of tester 110 through line 132. In the illustrated embodiment, cable input 133 is a 4-cable input connected to four cylinders of the engine under test, and cable input 135 is a 4-cable input connected to four different cylinders of the engine under test, if the engine has six or eight cylinders. Alternatively, cable input 133 could simply connect to a single cylinder of the engine under test; in such an embodiment, multiplexer 134 and cylinder select switch 128 are not necessary. When cable inputs 133 and 135 of tester 110 are equipped to simultaneously connect to multiple spark plug wires of the engine under test, the secondary ignition signals of the multiple cylinders are sent through multiplexer 134. Multiplexer 134 may for example be an 8-input multiplexer. A user may select the engine parameter to be displayed by positioning power/mode select switch 126, and may select the cylinder to be displayed by positioning cylinder select switch 128. Power/mode select switch 126 is connected to battery 137, so that power/mode select switch 126 allows a user to selectively connect and disconnect power to the tester 110. Switches 126 and 128 could be rotary switches, or could alternatively comprise any other user operable switching technology such as push buttons or the like. Power/mode select switch 126 is connected to processor 138 by line 140. Cylinder select switch 128 is connected to processor 138 by line 141. The selection of cylinder by the user is embodied as three signals on line 142 from processor 138 to control 8-input multiplexer 134. The secondary ignition signal selected is then output from multiplexer 134 to dwell circuit 144. The output of dwell circuit 144 is sent on line 146 to peak detect circuit 148, peak hold circuit 150, and amplifier 152. The output of peak detect circuit 148 is connected to processor 138 by line 154. The output of peak hold circuit 150 is connected to processor 138 by line 156. The output of amplifier 152 is connected to processor 138 by line 158.

Power supply circuit 160 is connected to power/mode select switch 126 on line 161 to monitor the battery 137 of tester 110, and the output of power supply circuit 160 is connected to processor 138 by line 162. Processor 138 may for example be a 68HC705P9 processor manufactured by Motorola Corporation, and operates to determine values of firing voltage, burn voltage and burn time, and communicates these values (as selected by a user through, positioning of rotary switch 136) to LCD controller 164 from its serial port on line 166. LCD controller 164 operates to control LCD display 130 by sending control signals on line 168.

In operation, a probe or probes are connected to one or more spark plug wires on the engine being tested, and the signal from the probe or probes enters the tester from cable inputs 133 and 135 at line 132. A user selects which ignition parameter to display (firing voltage, burn voltage, or burn time) by manipulating power/mode select switch 126, and also selects which cylinder of the engine to display test results for via cylinder select switch 128. The number of the cylinder selected is transmitted to the processor 138 and converted into three binary signals on line 142 to control multiplexer 134. The selected secondary ignition signal is output from multiplexer 134 to dwell circuit 144. Dwell circuit 144 rectifies the ignition circuit to its absolute value and attenuates the secondary ignition signal so that it is compatible with 0–5 V analog-to-digital converter channels of processor 138. The output of dwell circuit 144 is a representation of the secondary ignition signal, and is sent to various circuits on line 146. Peak detect circuit 148 operates on the rectified, attenuated representation of the secondary ignition signal on line 146 to determine when a firing voltage spike has occurred, and generates an active low interrupt signal to the processor 138 on line 154. The interrupt signal serves to trigger the processor 138 into operation, to begin appropriate measurements and the like. Peak hold circuit 150 operates on the rectified, attenuated representation of the secondary ignition signal on line 146 to create a signal that gradually slopes from an amplitude equal to the attenuated firing voltage of the secondary ignition signal down to zero, at a controlled fall rate. The output of peak hold circuit 150 is transmitted to an analog-to-digital converter channel of processor 138 on line 156. Amplifier 152 operates on the rectified, attenuated representation of the secondary ignition signal on line 146 to increase its amplitude so that burn voltage can be measured with more precision, since the attenuation of the secondary ignition signal initially brings the burn voltage value down into the noise range of the circuit. The output of amplifier 152 is transmitted to another analog-to-digital conversion channel of processor 138 on line 158. Power supply circuit 160 monitors the battery 137 of tester 110, and upon detecting a low battery condition, transmits an indicating signal on line 162 to another analog-to-digital conversion channel of processor 138. Processor 138, in conjunction with application code stored in memory 170, calculates and converts values for firing voltage, burn voltage and burn time, and transmits appropriate values (according to selections on rotary switch 136) on line 166 to LCD controller 164, for eventual display on LCD display 130. For example, the interrupt signal on line 154 from peak detect circuit 148 signals the processor to begin taking measurements of burn voltage. Measurements are taken at predetermined time intervals. When the burn voltage signal falls below a threshold, measurements are discontinued. The average value of burn voltage measured is the burn voltage value determined by processor 138. The number of measurements taken (since they are at predetermined time intervals) are counted to determine the burn time value. Other techniques for determining the values of burn voltage and burn time are known, and contemplated by the invention.

Current parameter values can be displayed on display 130. In addition, in conjunction with memory 170, processor 138 operates to store maximum and minimum values for the parameters measured, which are also displayed on LCD display 130. Maximum and minimum parameter values are stored until they are reset by a user or power is interrupted in the tester 110.

Figure 7:
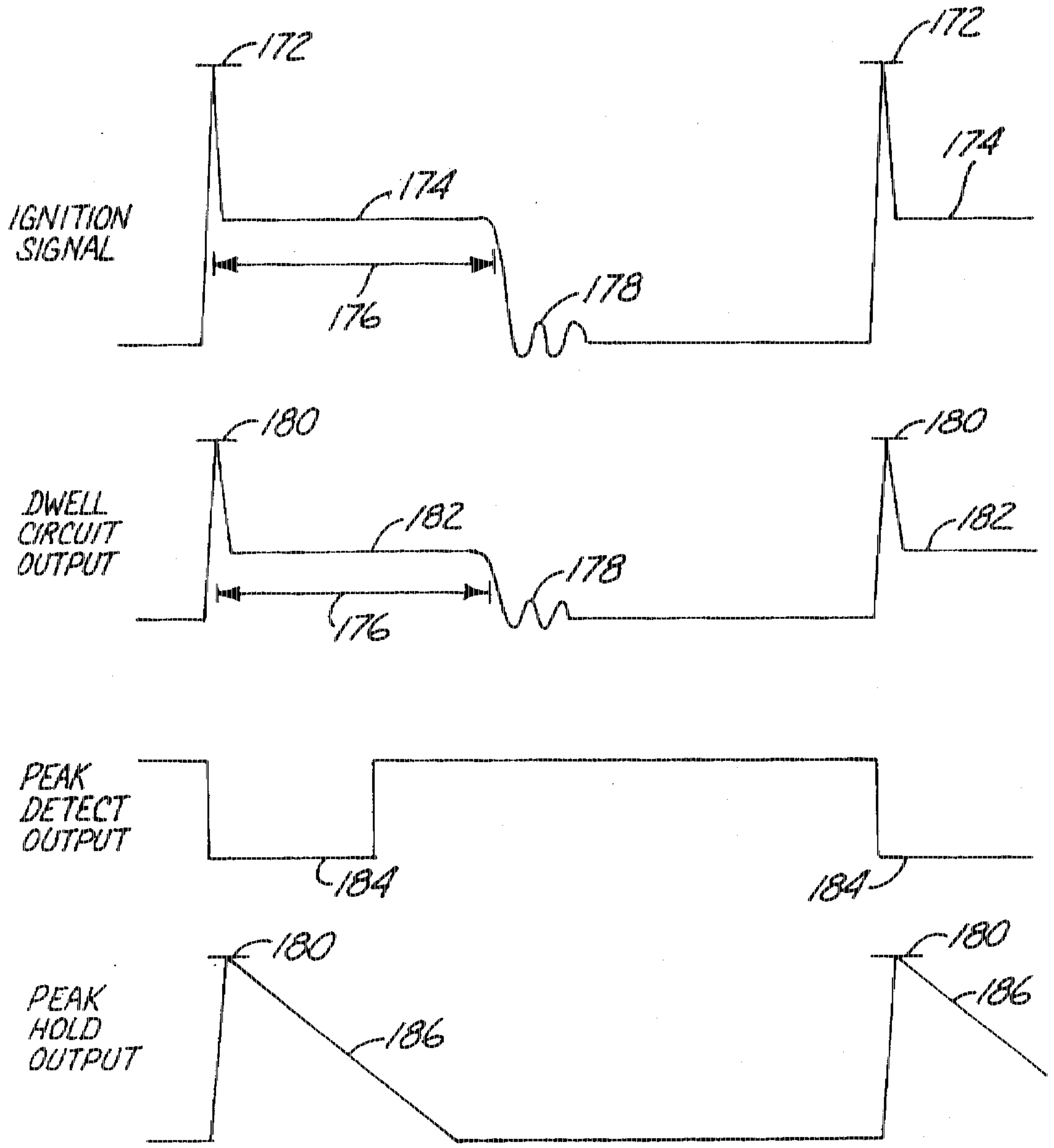
FIG. 7 is a timing diagram showing signals at various points in the block diagram of FIG. 6.

FIG. 7 shows a timing diagram of the secondary ignition signal and the outputs of dwell circuit 144, peak detect circuit 148 and peak hold circuit 150 (FIG. 6). The secondary ignition signal spikes up to peak firing voltage 172. The signal then falls off to burn voltage level 174. After a burn time 176 at burn voltage 174, the secondary ignition signal falls to approximately 12–15 volts after ringing 178. The output signal of the dwell circuit mirrors the secondary ignition signal, rectifying it to its absolute value and attenuating it by a predetermined amount to attenuated peak firing voltage 180 and attenuated burn voltage 182. The peak detect circuit output generates an active low interrupt pulse 184 when the secondary ignition signal spikes up to peak firing voltage 172. The peak hold circuit output spikes up to attenuated peak firing voltage 180, and gradually falls to approximately zero with slope 186.

Figure 8:
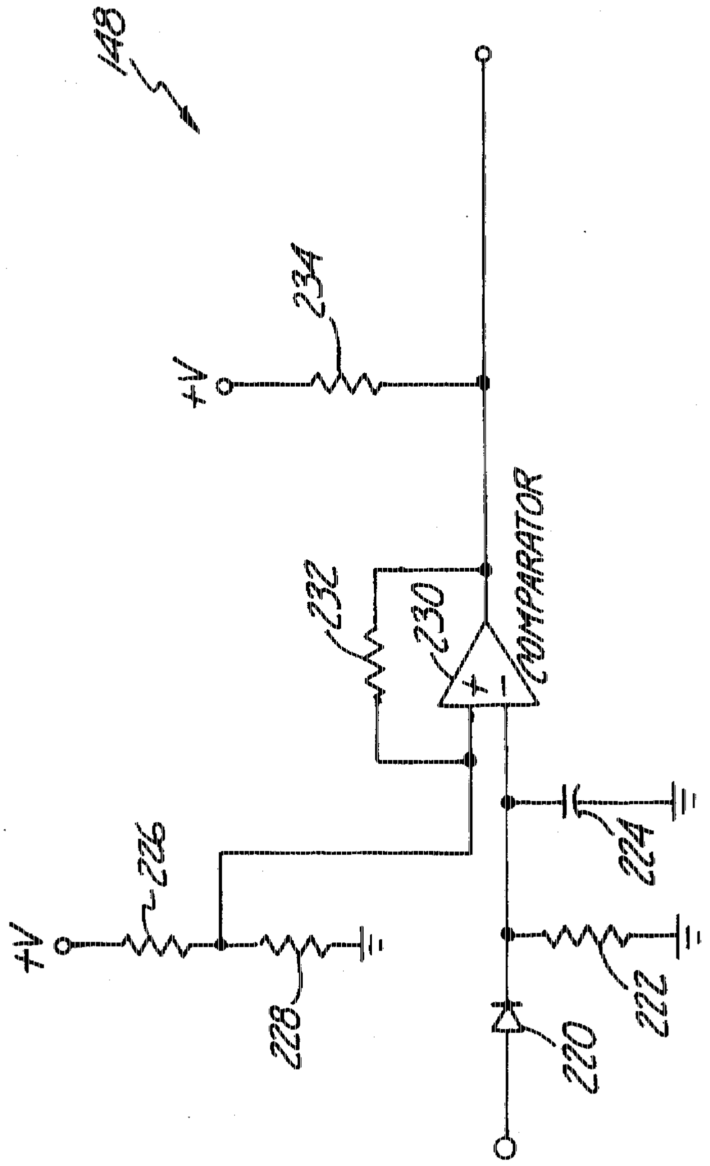
FIG. 8 is a schematic diagram of the peak detect circuit shown in FIG. 6.

FIG. 8 shows a schematic diagram of peak detect circuit 148 (FIG. 6). Peak detect circuit 148 receives as an input a rectified, attenuated secondary ignition signal, which passes through diode 220 to the negative input of comparator 230. Resistor 222 and capacitor 224 are connected in parallel to ground. Resistor 226 is connected between the positive input of the comparator 230 and a positive voltage supply, and resistor 228 is connected between the positive input of the comparator 230 and ground. Resistor 232 is connected in a feedback path between the positive input of comparator 230 and the output terminal of comparator 230. Pull-up resistor 234 is connected between the output terminal of comparator 230 and a positive voltage supply. The signal at the output of comparator 230 is the peak detect signal, which is an active low pulse when a peak is detected.

Figure 9:
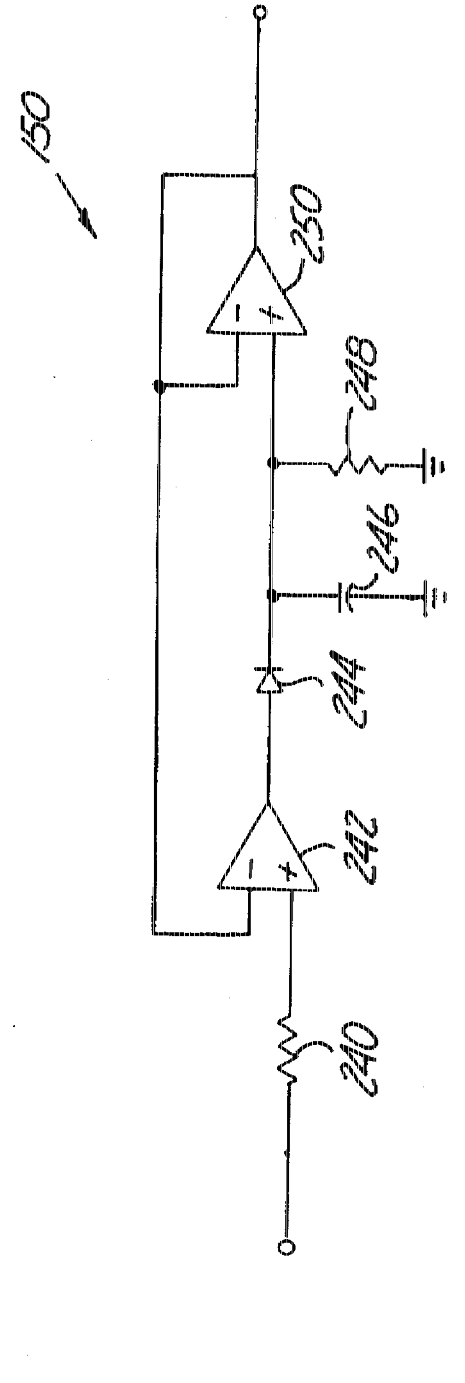
FIG. 9 is a schematic diagram of the peak hold circuit shown in FIG. 6.

FIG. 9 shows a schematic diagram of peak hold circuit 150 (FIG. 6). Peak hold circuit 150 receives as input a rectified, attenuated secondary ignition signal, which travels through resistor 240 to the non-inverting input of operational amplifier 242. The output of operational amplifier 242 is series connected through diode 244 to the non-inverting input of operational amplifier 250. That input also has capacitor 246 and resistor 248 parallel connected from it to ground. The non-inverting inputs of operational amplifier 242 and operational amplifier 250 are connected to each other, and also connected to the output of operational amplifier 250, which carries the peak hold signal. The peak hold signal controllably decreases from an amplitude equal to the firing voltage of the rectified secondary ignition signal to an amplitude of zero, at a rate controlled by the values of capacitor 246 and resistor 248. The fall time of the peak hold signal is equal to capacitor 246 divided by resistor 248.

Figure 10:
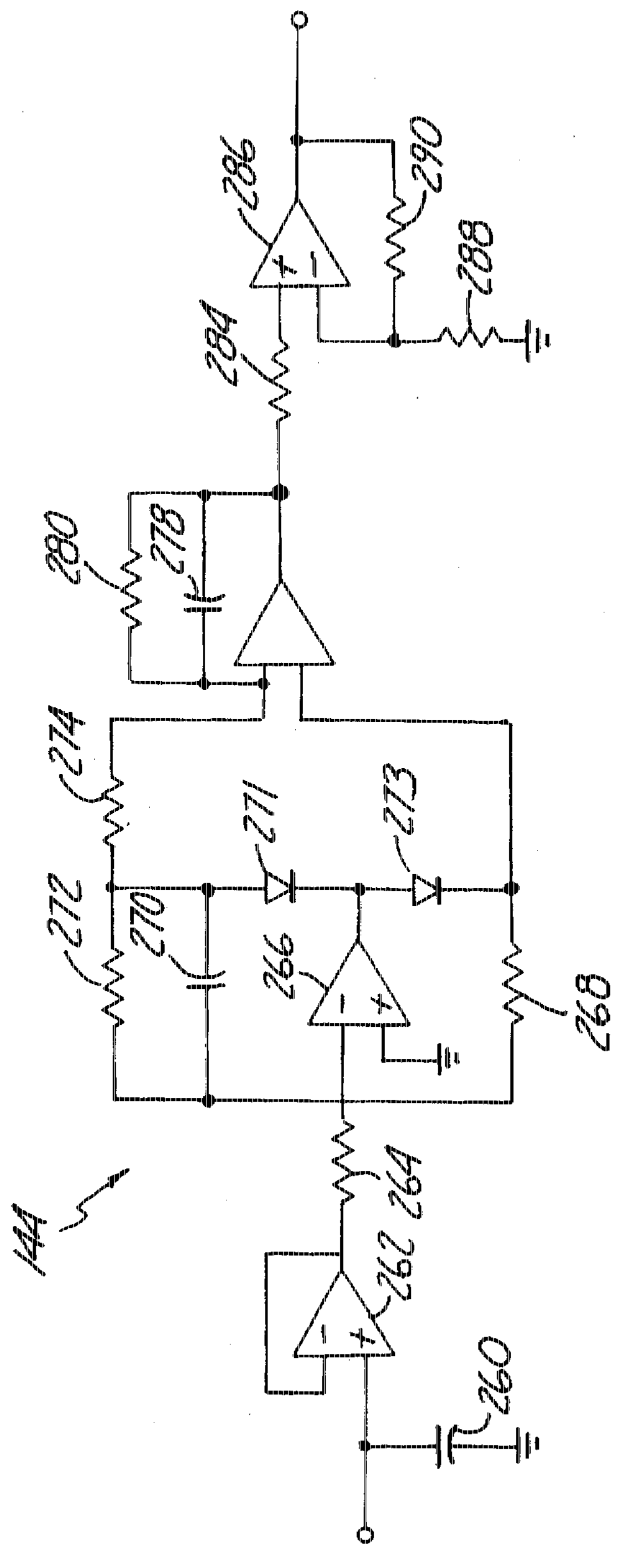
FIG. 10 is a schematic diagram of the dwell signal circuit and amplifier circuit shown in FIG. 6.

FIG. 10 shows a schematic diagram of dwell circuit 144 (FIG. 6). Dwell circuit 144 receives as input the secondary ignition signal from the probe connected to a spark plug wire (for the selected cylinder when this option is available). Capacitor 260 is connected in parallel to ground. The secondary ignition signal is connected to the non-inverting input of operational amplifier 262. The inverting input of operational amplifier 262 is connected in a feedback path to the output of operational amplifier 262. The output of operational amplifier 262 is series connected through resistor 264 to the inverting input of operational amplifier 266. The non-inverting input of operational amplifier 266 is connected to ground. Resistor 272 and capacitor 270 are connected in parallel, and diode 271 is further connected in series, between the inverting input of operational amplifier 266 and the output of operational amplifier 266. Additionally, resistor 268 and diode 273 (reverse connected) are connected in series between the inverting input of operational amplifier 266 and the output of operational amplifier 266. The terminal between resistor 268 and diode 273 is connected to the non-inverting input of operational amplifier 276. The terminal between resistor 272 and capacitor 270 (connected in parallel) and diode 271 is connected in series through resistor 274 to the inverting input of operational amplifier 276. Resistor 280 and capacitor 278 are connected in parallel between the inverting input of operational amplifier 276 and the output of operational amplifier 276. The output terminal of operational amplifier 276 is labeled as 282, and represents the rectified, attenuated dwell signal which is input to peak detect circuit 148 (see FIG. 8) and peak hold circuit 150 (see FIG. 9). This signal is amplified by connecting it in series through resistor 284 to the noninverting input of operational amplifier 286. The inverting input of operational amplifier 286 is connected through resistor 288 to ground, and resistor 290 is connected in a feedback path between the inverting input of operational amplifier 286 and the output of operational amplifier 286. The output of operational amplifier 286 is the amplified dwell signal.

The embodiment shown in FIGS. 1–4 provides a system for testing an internal combustion engine which is connectable to a voltmeter, using the display of the voltmeter to output to a user a measurement of peak firing voltage. The system provides a numerical value of firing voltage on the voltmeter display, which is a significant improvement over prior systems which merely indicated the presence of a spark signal. The system is preferably portable, and has a self-contained power supply. The system is simple in its construction and operation, allowing it to be very small and inexpensive while providing useful, quantitative ignition information.

The embodiment shown in FIGS. 5–10 provides a fully functional ignition analyzer, including options to display peak firing voltage, burn voltage and burn time, and options to connect to multiple cylinders of an engine being tested. The system is inexpensive, easy to use, and does not require multiple complex connections to the engine. The system is preferably housed within a hand-held housing, and is battery powered. This is a significant improvement over large engine analyzers which operate from wall socket power, are not portable, are expensive, and are difficult to use.

Although the present invention has been described with reference to preferred embodiments, workers skilled in the art will recognize that changes may be made in form and detail without departing from the spirit and scope of the invention.

What is claimed is:

1. An apparatus for testing an internal combustion engine comprising:

probe means for electrically connecting the testing apparatus to at least one spark plug wire of the engine;

a rectifying circuit for converting a secondary ignition signal received from the probe means to an absolute value of the secondary ignition signal received;

a peak hold circuit for storing a representation of a peak firing voltage signal of the rectified secondary ignition signal and for attenuating the stored representation of the peak firing voltage signal at a predetermined rate over time so that the peak firing voltage signal can be measured by a voltmeter; and connecting means for connection to the voltmeter to display a value of the peak firing voltage signal.

2. The testing apparatus of claim 1 further comprising:

a housing of a size to be held in a user's hand, wherein the rectifying circuit and the peak hold circuit are disposed in the housing.

3. The portable testing apparatus of claim 2 further comprising:

power supplying circuitry contained in the housing.

4. The testing apparatus of claim 1 further comprising:

voltage adding circuitry for adding a known voltage to a ground reference of the voltmeter.

5. Apparatus for testing an internal combustion engine comprising:

probe means for electrically connecting the testing apparatus to at least one spark plug wire of the engine;

a dwell circuit for converting a secondary ignition signal received from the probe means to an absolute value of the secondary ignition signal received and for attenuating the secondary ignition signal by a predetermined amount;

a peak detect circuit for detecting a peak firing voltage signal of the attenuated secondary ignition signal;

a peak hold circuit for storing the peak firing voltage signal of the attenuated secondary ignition signal and for attenuating the stored peak firing voltage signal at a predetermined rate over time so that its value can be accurately measured;

an amplifier for increasing the amplitude of the attenuated secondary ignition signal so that burn voltage of the secondary ignition signal can be accurately measured; and a processor for receiving outputs from the peak detect circuit, the peak hold circuit, and the amplifier, and for converting the outputs received into data values representing firing voltage, burn voltage, and burn time of the engine's combustion.

6. The testing apparatus of claim 5 further comprising:

an electronic memory for storing maximum and minimum data values for firing voltage, burn voltage, and burn time of the engine.

7. The testing apparatus of claim 5 further comprising:

a housing of a size to be held in a user's hand, wherein the dwell circuit, peak detect circuit, peak hold circuit, amplifier, and processor are disposed in the housing.

8. The testing apparatus of claim 7 further comprising:

power supplying circuitry, including a battery power source, contained in the housing.

9. The portable testing apparatus of claim 8 further comprising:

battery voltage indicating circuitry for monitoring the status of the battery and transmitting a low battery indicator to the processor when battery voltage is lower than a predetermined threshold.

10. The portable testing apparatus of claim 5 further comprising:

a display for displaying to a user values measured by the portable testing apparatus.

11. The portable testing apparatus of claim 10 further comprising:

switch means on the housing for selecting whether firing voltage, burn voltage, or burn time is to be displayed by the portable testing apparatus.

12. The portable testing apparatus of claim 5 wherein the probe means electrically connects a plurality of spark plug wires to the portable testing apparatus, and further comprising:

a multiplexer circuit for selecting a cylinder of the engine to test from the plurality of spark plug wires connected to the portable testing apparatus by the probe means.

13. The portable testing apparatus of claim 12 further comprising:

switch means on the housing for controlling the multiplexer circuit to select a particular cylinder of the engine to test.

14. A portable apparatus for testing an internal combustion engine comprising:

a housing of a size to be held in a user's hand;

probe means for electrically connecting the portable testing apparatus to at least one spark plug wire of the engine;

circuitry within the housing for receiving a secondary ignition signal from the probe means and for creating a plurality of representations of the secondary ignition signal to enable measurement of peak firing voltage, burn voltage and burn time of the secondary ignition signal; and a display for displaying the values of the peak firing voltage, burn voltage and burn time of the secondary ignition signal.

15. The portable testing apparatus of claim 14 wherein the display is disposed on the housing.

16. The portable testing apparatus of claim 14 wherein the probe means electrically connects the portable testing apparatus to a plurality of spark plug wires of the engine, and wherein the circuitry within the housing further comprises multiplexing circuitry to selectively receive a secondary ignition signal from one of the plurality of spark plug wires of the engine.

17. The apparatus of claim 14 further comprising a power source contained in the housing.

18. A system for testing an internal combustion engine comprising:

a tester housing;

probe means for electrically connecting the tester housing to at least one spark plug wire of the engine;

circuitry within the tester housing for receiving a secondary ignition signal from the probe means and for creating a representation of the secondary ignition signal having an attenuation characteristic enabling measurement of peak firing voltage of the secondary ignition signal by an external integrating voltmeter; and the external integrating voltmeter being operatively connected to the tester housing to measure and display a value of peak firing voltage.

19. The system of claim 18 further comprising a power source contained in the tester housing.

20. The system of claim 18 wherein the attenuation characteristic of the representation of the secondary ignition signal includes a predetermined decay over time from a peak voltage level.

* * * * *

UNITED STATES PATENT AND TRADEMARK OFFICE

CERTIFICATE OF CORRECTION

PATENT NO. : 5,714,679

DATED : FEBRUARY 3, 1998

INVENTOR(S) : STEVEN J. NICHOLS, RANDEE L. KYROLA, ERIC J. VANDEZANDE, KARL E. BROWN

It is certified that error appears in the above-identified patent and that said Letters Patent is hereby corrected as shown below:

On the Title Page [73] Assignee: insert --SPX Corporation, Muskegon, Mich.--

On the Title Page Col. 2, insert --Attorney, Agent, or Firm - Kinney & Lange, P.A.

Signed and Sealed this

Eleventh Day of April, 2000

*Attest:*

Q. TODD DICKINSON

*Attesting Officer*

*Director of Patents and Trademarks*